F. STARIN.
BALL BEARING.
APPLICATION FILED JUNE 14, 1913.
1,091,544.
Patented Mar. 31, 1914.
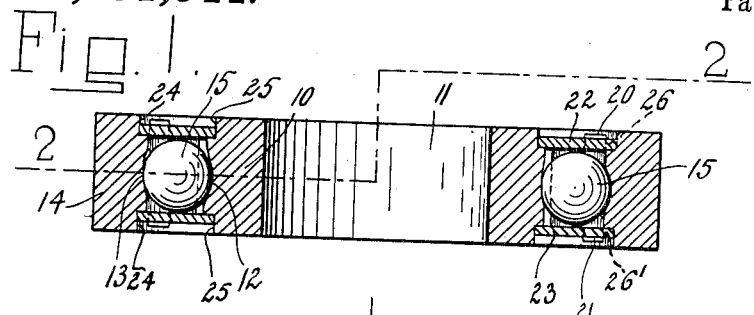
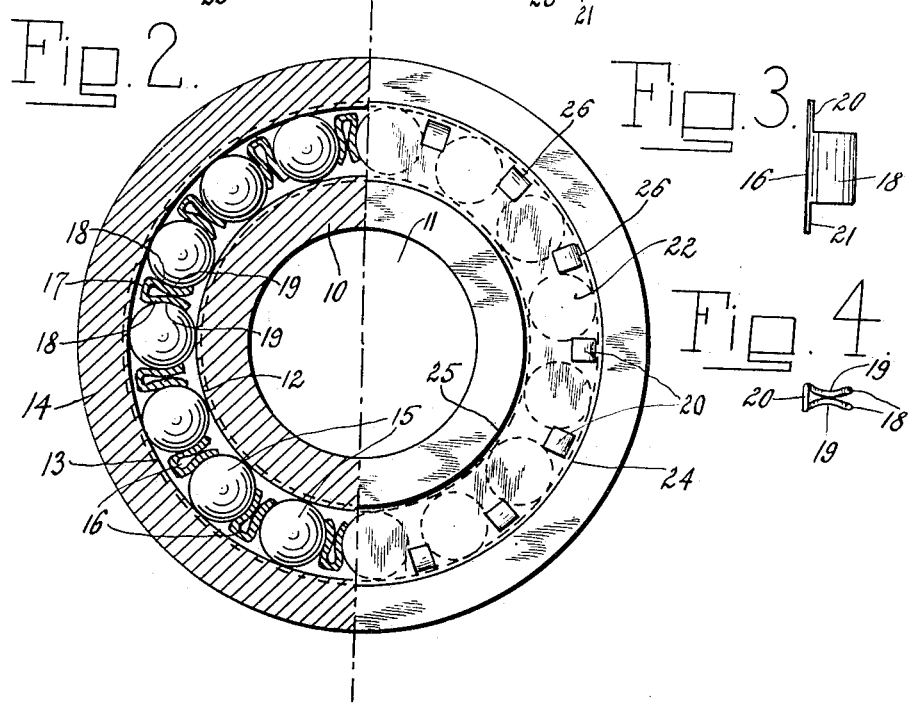
WITNESSES
INVENTOR
Frank Starin
BY
Sigmund Herzog
his ATTORNEY

UNITED STATES PATENT OFFICE.

FRANK STARIN, OF SPRINGFIELD, MASSACHUSETTS.

BALL-BEARING.

1,091,544.  Specification of Letters Patent.  Patented Mar. 31, 1914.

Application filed June 14, 1913. Serial No. 773,713.

*To all whom it may concern:*

Be it known that I, FRANK STARIN, a subject of the Emperor of Austria-Hungary, and resident of the city of Springfield, in the county of Hampden and State of Massachusetts, have invented certain new and useful Improvements in Ball-Bearings, of which the following is a specification.

The present invention relates to ball bearings, and more particularly to that type in which the balls are spaced apart by suitably shaped separating means.

One of the objects of the invention is to produce a ball bearing in which the separators are supported by and held in fixed position relative to each other by means disposed outside of the raceways of the balls, such supporting means serving at the same time to prevent dust or other foreign matter from entering the raceways or between the contacting surfaces of the balls and their separators.

Another object of the invention is to provide a device of this type which is simple in construction, efficient in operation, and which can be manufactured on a commercial scale, or in other words which is not so difficult to produce as to be beyond the reasonable cost of such an article.

With these and other objects in view, which will more fully appear as the nature of the invention is better understood, the same consists in the combination, arrangement and construction of parts hereinafter fully described, pointed out in the appended claim and illustrated in the accompanying drawings, it being understood that many changes may be made in the size and proportion of the several parts and details of construction within the scope of the appended claim without departing from the spirit or sacrificing any of the advantages of the invention.

Two of the many possible embodiments of the invention are illustrated in the accompanying drawings, in which:—

Figure 1 is a central vertical section taken through a ball bearing constructed in accordance with the present invention; Fig. 2 is a section taken on line 2—2 of Fig. 1; Fig. 3 is a side elevation of one of the separators; Fig. 4 is a plan view of said separator; Fig. 5 is a central vertical section taken through a modified bearing; Fig. 6 is a section taken on line 6—6 of Fig. 5, only half of said bearing being shown; Fig. 7 is a side elevation of one of the separators employed on the bearing shown in Figs. 5 and 6; and Fig. 8 is a plan view of the separator shown in Fig. 7.

Referring now more particularly to Figs. 1 to 4, inclusive, the numeral 10 indicates the inner bearing ring, having a bore 11, by which the ring may be secured in any approved manner to an axle or shaft. This ring is provided with a raceway 12, in alinement with the raceway 13 of an outer bearing ring 14. A series of balls 15 are disposed intermediate the bearing rings, and run in the said raceways. The balls are spaced apart by separators, denoted by the numeral 16. Each of these separators is made of a comparatively soft material, for instance brass, comprising a plate, preferably formed by stamping, and bent at its middle portion 17 back upon itself to form side wings 18, which are adapted to extend transversely of the raceways, the outer faces 19 of said side wings being curved so as to loosely embrace sections of two adjoining balls. From the side wings 18 extend upward and downward lugs 20 and 21, respectively, by means of which the separators are attached to supporting rings 22 and 23, respectively. These rings are disposed within grooves 24 and 25 in the outer bearing ring 14 and in the inner bearing ring 10, respectively, transversely of and outside the raceways above and below the balls, and more particularly in such a manner that the said balls are in contact therewith. The separators are attached to the supporting rings by forming in the latter slots 26 and 26', respectively, in alinement with each other, the lugs 20 and 21 being seated in said slots and bent upon the outer faces of the supporting rings toward the center of the bearing.

It will be observed that, since the supporting rings 22 and 23 completely inclose the annular space between the bearing rings 10 and 14, any possibility of dust or foreign matter entering said annular space is effectively prevented. The separators 16, being fixedly attached to the supporting rings, will obviously retain the balls in fixed relation to each other. Inasmuch as the separators are interconnected, the breakage of a ball does not affect materially the operation of the bearing for the reason that all other balls are retained in their proper positions.

What I claim is:—

In a bearing, the combination with two bearing rings having raceways, of a plurality of balls running therein, supporting rings disposed outside of said raceways covering completely the annular space between said bearing rings, each ring being provided with plurality of slots, the slots in one ring being in alinement with those in the other one, and separators intermediate adjacent balls, each separator comprising a plate bent at its middle portion back upon itself to form side wings, the outer faces of said wings being curved and in contact substantially throughout their widths with sections of two adjacent balls, each separator being provided at the upper and lower ends of its middle portion with lugs in engagement with two registering slots in said rings and bent onto the outer faces of the latter in radial directions.

Signed at Springfield, in the county of Hampden and State of Massachusetts, this 11th day of June, A. D. 1913.

FRANK STARIN.

Witnesses:
 FRED RIEDEL,
 OTTO CRONAN.